United States Patent [19]

Aoyama

[11] 4,193,381
[45] Mar. 18, 1980

[54] SPARK ADVANCE CONTROL DEVICE FOR ENGINE EQUIPPED WITH EGR SYSTEM

[75] Inventor: Syunichi Aoyama, Yokohama, Japan

[73] Assignee: Nissan Motor Company, Limited, Yokohama, Japan

[21] Appl. No.: 852,533

[22] Filed: Nov. 17, 1977

[30] Foreign Application Priority Data

Nov. 19, 1976 [JP] Japan .................. 51/139872

[51] Int. Cl.² .................................. F02M 25/06
[52] U.S. Cl. ..................... 123/119 A; 123/117 A
[58] Field of Search ................. 123/119 A, 117 A

[56] References Cited

U.S. PATENT DOCUMENTS

| 3,896,777 | 7/1975 | Masaki et al. | 123/119 A |
|---|---|---|---|
| 4,008,697 | 2/1977 | Konno | 123/119 A |
| 4,041,917 | 8/1977 | Suzuki | 123/119 A |
| 4,083,335 | 4/1978 | Ohata | 123/117 A |

FOREIGN PATENT DOCUMENTS

51-46626 4/1976 Japan.

Primary Examiner—Louis J. Casaregola

[57] ABSTRACT

An engine is equipped with an EGR system in which the amount of recirculated exhaust gases is controlled in response to an intake vacuum in an intake passage. The spark timing of the engine is controlled to advance in accordance with the increase of the amount of the recirculated exhaust gases so as to maintain stable engine running even under a considerably high EGR rate.

8 Claims, 9 Drawing Figures

SPARK ADVANCE CONTROL DEVICE FOR ENGINE EQUIPPED WITH EGR SYSTEM

This invention relates to an improvement in an internal combustion engine equipped with an EGR(Exhaust Gas Recirculation) system, and more specifically to a spark timing control system of the engine equipped with particular types of EGR system.

It is the principal object of the present invention to provide an improved internal combustion engine in which the emission level of NOx is remarkedly decreased without causing degradation of the driveability of a motor vehicle on which the engine is mounted.

Another object of the present invention is to provide an internal combustion engine in which the spark timing is controlled in accordance with the amount of the recirculated exhaust gases by an EGR system to maintain improved stable running of the engine and improved fuel consumption even under a condition where a considerably large amount of the exhaust gases is recirculated back to the combustion chambers of the engine.

A further object of the present invention is to provide an internal combustion engine equipped with an improved spark advance control device which is arranged to increase the degree of spark advance as the amount of the recirculated exhaust gases increases.

A still further object of the present invention is to provide an internal combustion engine equipped with an improved spark advance control device which is controlled in response to a vacuum signal representing the variation of the amount of the recirculated exhaust gases.

Other objects, features and advantages of the present invention will be more apparent from the following description taken in conjunction with the accompanying drawings in which.

It is known that the advance of the spark timing of each spark plug of an internal combustion engine is controlled by combination of a vacuum advance mechanism and a centrifugal advance mechanism in an internal combustion engine equipped with an EGR system in which exhaust gases are recirculated back to the engine. In such an engine, the vacuum advance mechanism is, in general, governed by an intake vacuum in an intake passageway leading to the combustion chamber of the engine. This intake vacuum is generated adjacent a carburetor throttle valve and sensed through a particular hole opened to the intake passageway, the particular hole being located just upstream of the uppermost portion of the peripheral edge of the throttle valve at its fully closed position.

Figure 1:
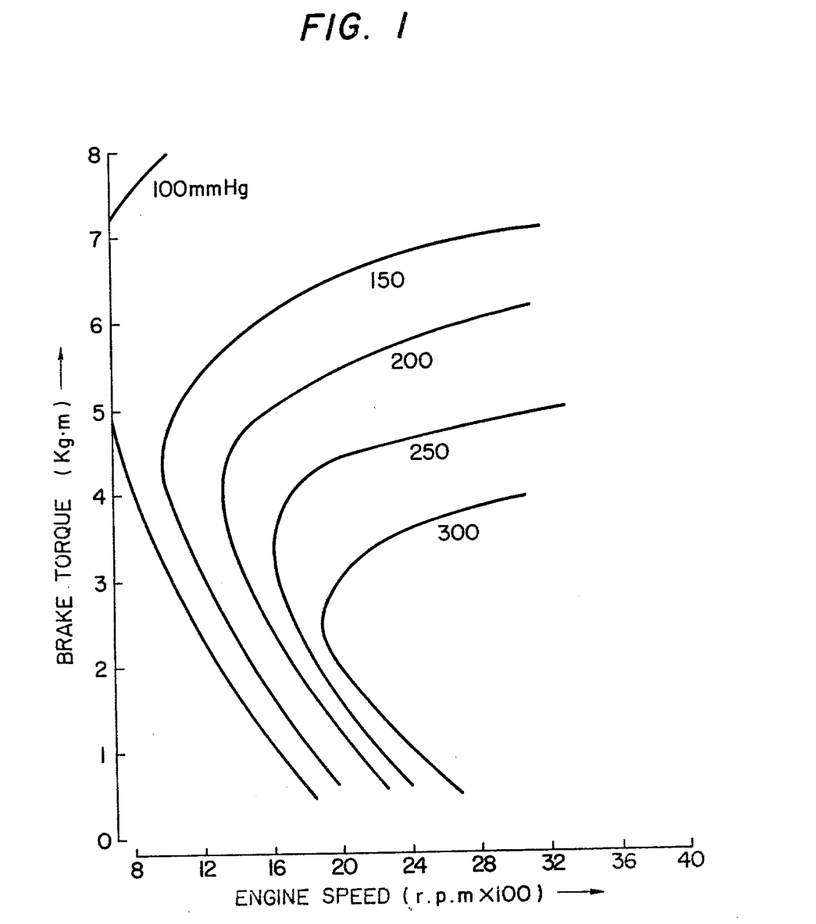
FIG. 1 is a graph showing the characteristics of an intake vacuum for controlling the vacuum advance mechanism of a prior art engine, in terms of engine speed and brake torque.
Figure 2:
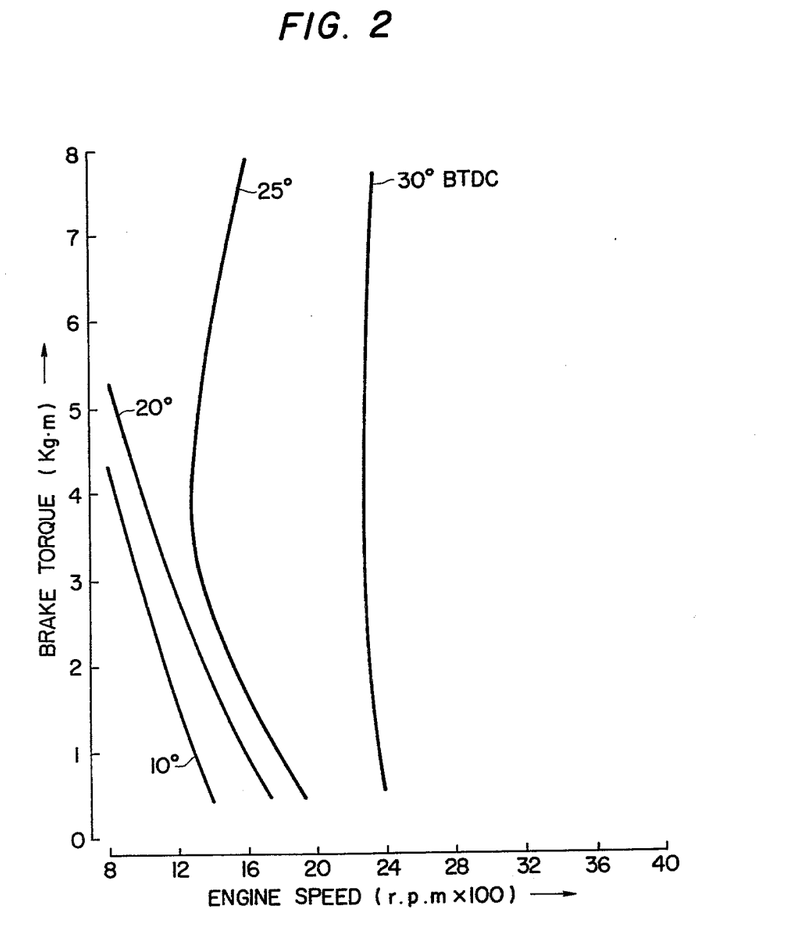
FIG. 2 is a graph showing the spark advance characteristics of the prior art engine in terms of engine speed and brake torque, which characteristics are obtained by the vacuum advance mechanism in combustion with a centrifugal advance mechanism.

Although the characteristics of the intake vacuum sensed through the particular hole is presented as shown in FIG. 1, the spark advance in the prior art engine is controlled in accordance with the characteristics shown in FIG. 2 because of combination of the vacuum advance mechanism with the centrifugal advance mechanism which is governed by engine speed. As seen from FIG. 2, the spark advance is controlled to increase with the increases of engine speed and load at low engine speed operating condition, but to maintain generally constant at a degree of 30° BTDC regardless of engine load at medium engine speed operating range. As discussed above, in the prior art engine, the spark advance seems to be determined only in response to the engine speed.

However, such a spark advance manner is not desirable for an engine of the type wherein a relatively large amount of the exhaust gases is recirculated back to the combustion chamber of the engine. Because, in such an engine, the combustion is deteriorated to decrease the combustion speed of the charge in the combustion chamber with increase of the amount of the inert recirculated exhaust gases and therefore it is desirable to control the spark advance in accordance with the amount of the recirculation exhaust gases.

Figure 3:
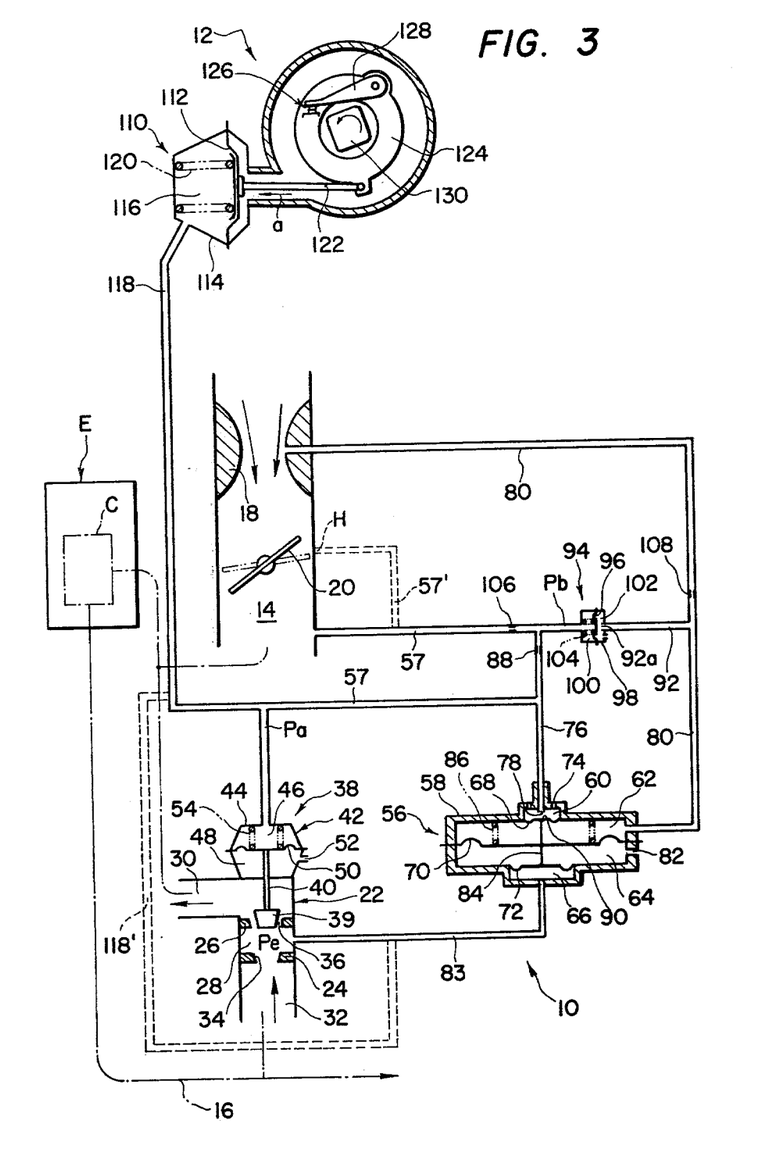
FIG. 3 is a schematic illustration of a preferred embodiment of an internal combustion engine in accordance with the present invention.

Referring now to FIG. 3 of the drawings, a preferred embodiment of an internal combustion engine (of a motorvehicle or an automobile) according to the present invention is shown including an engine proper E, an EGR control system 10 and a vacuum operated spark advance control device 12. The engine proper E has therein a combustion chamber C or a plurality of combustion chambers. The combustion chamber C communicates with the atmospheric air through an intake passageway 14 through which an air-fuel mixture is supplied to the combustion chamber C. The intake passageway 14 is provided thereinside with a venturi 18 and a throttle valve 20 which is rotatably disposed downstream of the venturi 18. The venturi 18 and the throttle valve 20 may form part of a carburetor (not shown) for preparing the air-fuel mixture. The reference numeral 16 indicates an exhaust gas passage providing communication between the combustion chamber C and the atmosphere to discharge the exhaust gases from the chamber C to the atmosphere.

The EGR control system 10 is composed of an EGR passageway 22 providing communication between the exhaust gas passageway 16 and the intake passageway 14 downstream of the throttle valve 20 for recirculating or conducting engine exhaust gas into the intake passageway 14. The EGR passageway 22 is formed therein with a partition member 24 or a flow restriction and a partition member 26 which divides the EGR passageway 22 into an upstream portion 28, 32 and a downstream portion 30. In the upstream portion, a chamber 28 is defined between the partition members 24 and 26. The partition member 24 is formed therethrough with an orifice 34 which provides communication between a part 32 and the chamber 28 and forms together with the partition member 24 a restriction of the EGR passageway 22 which controls the flow of recirculated engine exhaust gas. The partition member 24 may not be used if the EGR passageway 22 is provided with any restriction for the flow of exhaust gases which restriction has the similar function to the partition member 24. The partition member 26 or a valve seat is formed therethrough with an aperture or passage 36 which provides communication between the chamber 28 and the downstream portion 30.

An EGR control valve assembly 38 is disposed such that its valve head 39 in the EGR passageway 22 is movable relative to the partition member 26. The valve head 39 is secured to a valve stem 40 extending therefrom externally of the EGR passageway 22. The EGR control valve assembly 38 includes a diaphragm unit 42 for operating the EGR control valve 38. The diaphragm unit 42 is composed of a housing 44 having first and second fluid or vacuum operating chambers 46 and 48, and a flexible diaphragm 50 separating the fluid chambers 46 and 48 from each other. The fluid chamber 48 is communicated through a hole 52 with the atmosphere. A spring 54 is provided to normally urge the diaphragm 50 in a direction to cause the valve head 39 to close the aperture 36. In this embodiment, the fluid chamber 46 of the diaphragm unit 42 communicates with the intake passageway 14 downstream of the throttle valve 20 through a passage 57 to receive a suction vacuum in the intake passageway 14. The fluid chamber 46 may communicate with the intake passageway 14 through a passage 57' indicated in broken lines. The passage 57' opens adjacent the edge of the throttle valve 20 through a hole H which is located just upstream of the uppermost portion of the peripheral edge of the throttle valve at its fully closed position.

A pressure control valve assembly 56 is provided to control the vacuum for operating the EGR control valve 38. The valve assembly 56 comprises a housing 58 having therein for chambers 60, 62, 64 and 66, and three flexible diaphragms 68, 70 and 72. The diaphragm 68 separates the chambers 60 and 62 from each other. The diaphragm 70 separates the chamber 62 and 64 from each other. The diaphragm 72 separates the chambers 64 and 66 from each other. The chamber 60 communicates with the atmosphere through an opening 74 and with the passage 57 through a passage 76 and an inlet port 78. The chamber 62 communicates with the venturi 18 through a passage 80. The chamber 64 is communicated through a hole 82 with the atmosphere. The chamber 66 communicates with the chamber 28 of the EGR passageway 22 through a passage 83. The diaphragm 70 has a working or pressure acting surface area larger than that of each of the diaphragms 68 and 72. The diaphragms 68, 70 and 72 are fixedly connected to each other, for example, by means of a rod 84 so that they are operated as one body. A spring 86 is provided to integrally urge the diaphragms 68, 70 and 72 in a direction opposed by the atmospheric pressure in the chamber 70. An orifice 88 is formed in the passage 57 on the intake passageway side of the junction to which the passage 76 is connected. A control valve 90 is located in the chamber 60 movably relative to the port 78 to control the flow of atmospheric air into the port 78 and is fixedly secured to the diaphragm 68.

A leak passage 92 is connected at its one end to the passage 57 on the intake passageway side of the orifice 88, and the other end thereof to the passage 80. Disposed in the leak passage 92 is a leak valve 94 which is composed of a diaphragm or a diaphragm valve member 96. The diaphragm 96 divides the interior of a casing 98 into a vacuum chamber 100 which communicates with the passage 57 and an atmospheric chamber 102 which is communicated with the atmosphere and with the passage 80 through the leak passage 92. A spring 104 is disposed in the vacuum chamber 100 to normally urge the diaphragm 96 in the direction to contact to and close the open end 92a of the relief passage 92 or an open end portion connecting to the leak passage 92. The end portion 92a is secured to a portion of the casing 98. This leak valve 94 is constructed and arranged to open the open end 92a of the passage 92 to bleed the atmospheric air through the passage 92 into the passage 80 when the vacuum applied to the diaphragm 96 exceeds a predetermined level. As seen, an orifice 106 is disposed in the passage 57 on the intake passageway side of the junction to which the passage 92 is connected. Additionally, an orifice 108 is disposed in the passage 80 on the carburetor venturi side of the junction to which the leak passage 92 is connected.

The vacuum operated spark advance control device 12 comprises a diaphragm unit 110 which consists of a diaphragm 112 which is secured inside a casing 114 of the diaphragm unit. The diaphragm 112 defines in the casing a vacuum operating chamber 116 which communicates through a passage 118 or a conduit with the passage 57 between the orifice 88 and the chamber 46 of the EGR control valve 38. A spring 120 is disposed in the vacuum operating chamber 116 to normally urge the diaphragm 112 in a direction to increase the volume of the vacuum operating chamber 116. A rod 122 is secured at one end thereof to the diaphragm 112 and at the other end thereof to a movable breaker plate 124 of a contact breaker assembly (no numeral) which plate 124 carries a contact breaker point 126. The breaker point 126 is arranged, as usual, to be openable when a breaker arm 128 is moved by the action of a rotatable revolving cam 130.

The vacuum operating chamber 116 of the diaphragm unit 110 may communicate with the chamber 28 in the EGR passageway 22 through a passage 118' and the passage 83 in order that the vacuum operating chamber 116 is supplied with the pressure $P_e$ in the chamber 28.

The operation of the thus arranged engine will be discussed hereinafter. At first, that of the EGR control system will be illustrated.

When the venturi vacuum is increased, the diaphragms 68, 70 and 72 are integrally moved so that the valve 90 reduces the degree of opening of the port 78 to reduce the flow of atmospheric air admitted into the passage 76 and therefore the degree of dilution of the suction vacuum $P_a$ conducted into the chamber 46 is reduced. As a result, the degree of opening of the EGR control valve 38 is increased to increase the amount of exhaust gases recirculated into the combustion chamber C of the engine. In this case, the control valve 38 is arranged to start to open when the suction vacuum $P_a$ reaches to a predetermined level such as 60 mmHg.

Thus, the pressure $P_e$ in the chamber 28 is reduced and therefore in the chamber 66 of the valve assembly 56. The decrease in the pressure $P_e$ moves the diaphragms 68, 70 and 72 integrally to increase the degree of opening of the control valve 90 to the port 78 to increase the flow of atmospheric air admitted into the passage 76. Consequently, the dilution of the suction vacuum $P_a$ with the atmospheric air is increased to reduce the degree of opening of the EGR control valve 38 to increase the pressure $P_e$ in the chamber 28.

On the contrary, when the venturi vacuum is decreased, the degree of dilution of the suction vacuum $P_a$ conducted into the chamber 46 is increased and accordingly the degree of opening of the EGR control valve 38 is decreased to decrease the amount of exhaust gases recirculated into the combustion chamber 12a of the engine. This increases the pressure $P_e$ and accordingly the pressure in the chamber 66 of the valve assembly 56. As a result, the dilution of the suction vacuum with the atmospheric air is decreased to increase the degree of the opening of the EGR control valve 38 to reduce the pressure $P_e$ in the chamber 28.

By the repetition of such operations or such feedback controls, the pressure $P_e$ and the degree of opening of the EGR control valve 38 are converged respectively to values in which the pressure $P_e$ is balanced with the venturi vacuum to increase and reduce the recirculated exhaust gas flow accurately in accordance with the increases and decreases in the venturi vacuum.

When the pressure $P_e$ in the chamber 28 is varied regardless of the venturi vacuum by variations in the suction vacuum, the EGR control valve 38 is operated to cancel the variations in the pressure $P_e$ by the pressure regulating valve assembly 56. In this instance, when the pressure $P_3$ is a negative pressure and the negative pressure is increased, the diaphragms 68, 70 and 74 are integrally moved to increase the degree of opening of the control valve 90 to the port 78. As a result, the degree of opening of the EGR control valve 38 is reduced similarly as mentioned above to reduce the influence of the suction vacuum on the pressure $P_e$ to restore same to an initial value to prevent the recirculation exhaust gas flow from being varied irrespective of the venturi vacuum. It will be appreciated from the foregoing that the pressure $P_e$ is controlled to a predetermined level and therefore the recirculated exhaust gas flow is varied only as a function of the venturi vacuum generated at the venturi portion of the carburetor.

Under high speed and low load engine operating condition where the NOx emission level is relatively low, both the venturi vacuum generated at the venturi 18 of the carburetor 13 and the intake vacuum downstream of the throttle valve 20 increase. Consequently, the composed vacuum $P_b$ or the sum of the intake vacuum downstream of the throttle valve 20 and the suction vacuum $P_a$ supplied to the chamber 46 of the diaphragm unit 42 is increased over a predetermined level and applied to the diaphragm 96 of the leak valve 94 to move it in the direction to separate from the open end 92a of the passage 92 against the bias of the spring 104. The atmospheric air then bleeds into the passage 80 leading to the chamber 62 of the valve assembly 56 and consequently the venturi vacuum conducted into the chamber 62 is diluted to increase the opening degree of the control valve 90 to the port 78. As a result, the suction vacuum $P_a$ conducted into the chamber 46 of the diaphragm 42 is diluted to a level and accordingly the composed vacuum applied to the diaphragm 96 of the leak valve 94 is decreased. The diaphragm 96 is thus moved toward the open end 92a of the passage 92 to decrease the opening degree of the diaphragm 96 to the open end 92a of the passage 92. By this action of the leak valve, the venturi vacuum in the chamber 62 of the valve assembly 56 is increased, but it again increase the suction vacuum in the passage 76 to increase the opening degree of the diaphragm 96 to the open end 92a. Therefore, the diaphragm 96 of the leak valve 94 is balanced to maintain a suitable bleed amount of air into the passage 80 and the chamber 62 of the valve assembly 56. It will be understood that the opening degree of the leak valve 94 is proportional to the degree of the composed vacuum $P_b$. The composed vacuum $P_b$ can be varied with the variation of the ratio between the sectional areas of the openings of the orifices 88 and 106. Thus, the increase of the recirculated gas flow is suppressed under high and low load engine operation condition, and the EGR rate is decreased with increased amount of intake air passing through the intake passageway 14 after the air bleed through the leak valve 94 begins. Accordingly, fuel consumption (fuel amount required for generating a unit power output) and driveability of the motor-vehicle can be effectively improved, greatly suppressing formation of nitrogen oxides in the combustion chamber of the engine.

With the above-mentioned operation of the EGR control system 10, the vacuum operated spark advance control device 12 will operate as follows.

When the suction vacuum is introduced through the passage 118 into the vacuum operating chamber 116 of the spark advance control device 12, the diaphragm 112 is moved to compress the spring 120 and accordingly the rod 122 is moved in the direction of an arrow a. This movement of the rod 122 causes the breaker plate 124 to rotate clockwise to advance the spark timing of a spark plug (not shown) disposed in the combustion chamber C of the engine E. It will be appreciated from the above, that the spark timing is advanced in accordance with the degree of the suction vacuum $P_a$ to be supplied to the chamber 46 of the EGR control valve assembly 38. Therefore, since the suction vacuum $P_a$ is a vacuum signal for controlling the amount of the exhaust gases recirculated back to the combustion chamber C, the spark timing is controlled in accordance with the amount of the recirculated exhaust gases.

Figure 4:
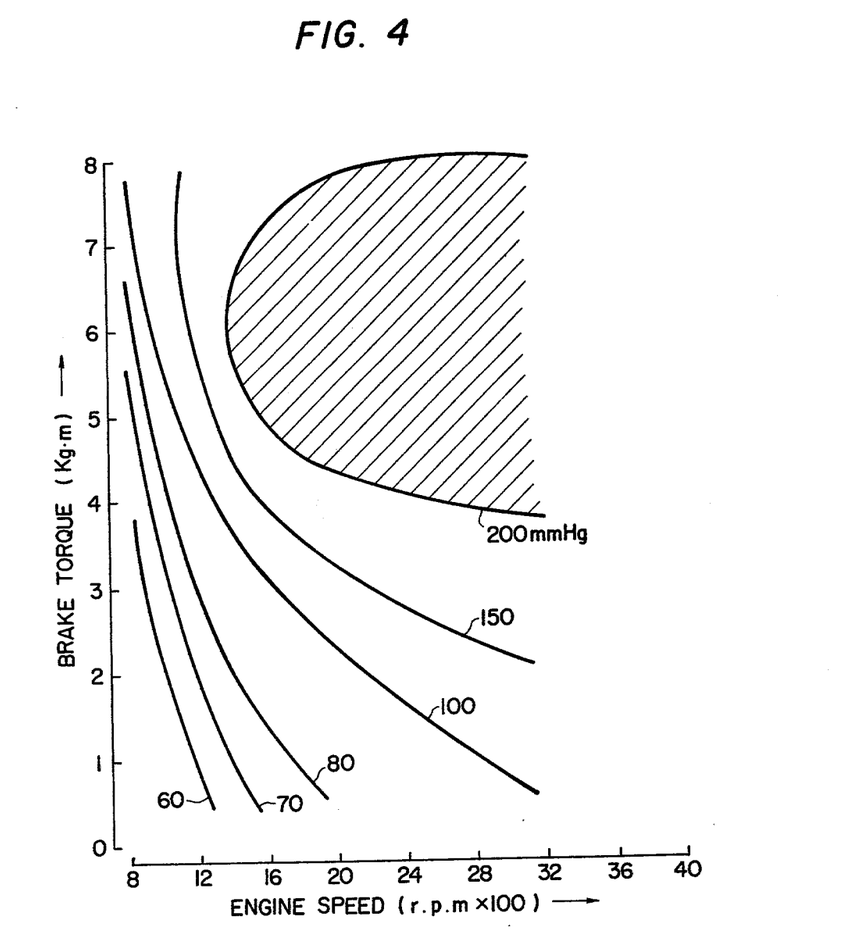
FIG. 4 is a graph showing the characteristics of a vacuum signal controlling the spark advance control device used in the engine of FIG. 3, in terms of engine speed and brake torque.

FIG. 4 shows the characteristics of the above-mentioned vacuum $P_a$ for controlling the EGR control valve 38 and the spark advance control device 12. As seen, the characteristics of the vacuum $P_a$ seems to be similar to that of the vacuum sensed at a hole corresponding to the above-mentioned hole H, shown in FIG. 1, but essentially different from each other in that the vacuum $P_a$ is low or small in absolute value and delicately changes with variation of the engine speed and engine load under high speed and low load engine operating condition. This makes possible a delicate and suitable control of the spark advance in cooperation with a centrifugal advance mechanism (not shown) governed by engine speeds. Under engine operating conditions up to medium engine speed and medium engine load, the characteristics of vacuum $P_a$ generally correspond to the increasing characteristics of the intake air inducted into the combustion chambers, thereby realizing a suitable spark advance characteristics which correspond to the engine operating conditions.

Figure 5:
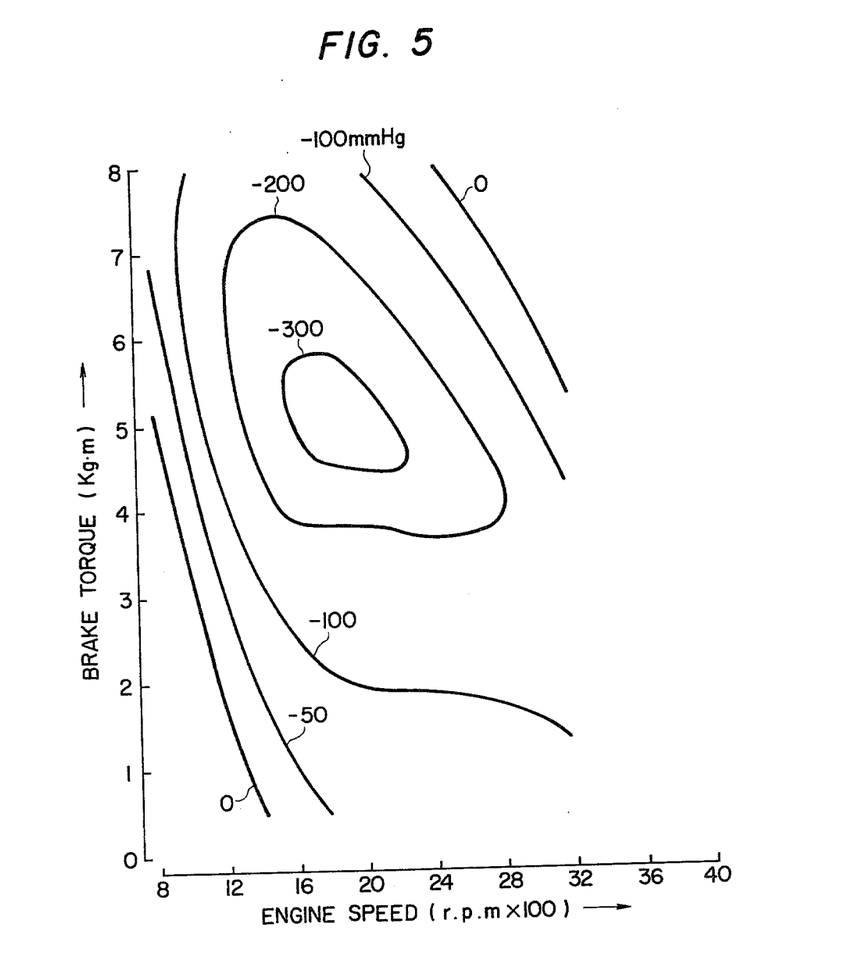
FIG. 5 is a graph similar to FIG. 4, but showing the characteristics of another vacuum signal controlling the spark advance control device used in the engine of FIG. 3.

FIG. 5 shows the characteristics of the above-mentioned pressure $P_e$ which is in the EGR passageway 22 upstream of the EGR control valve 38. This pressure $P_e$ decreases with increase of the intake air. The characteristics of the pressure $P_e$ correspond to that of increasing amount of the recirculated exhaust gases, in other words, that of the vacuum in the venturi 18. Accordingly, it will be understood that it is also very effective to operate the spark advancing device 12 with the pressure $P_e$. For this purpose, the vacuum operation chamber 116 of the spark advancing device 12 should be supplied with the pressure $P_3$ through the passage 118' shown in broken lines in FIG. 3.

The pressure $P_3$ can be varied within a range which is about 4 to 5 times that of the venturi vacuum, by changing the sectional opening area of the orifice 34 disposed in the EGR passageway 22, and/or changing the ratio of the effective surface areas of thr diaphragms 70 and 72 of the control valve assembly 56. Consequently, the pressure $P_e$ is sufficient to operate the spark advance control device 12 even if used without being amplified.

As is apparent from the foregoing, since both the vacuum $P_a$ and pressure $P_e$ are vacuum signals representing the amount of the recirculated exhaust gases which exactly corresponds to that of the intake air, they serve to suitably control the spark advance in response to the engine operating conditions. This contributes to achieve stable and reliable engine operation even in engines of the type where a considerably large amount of the exhaust gases is recirculated back to the combustion chamber of the engine.

It will be appreciated that the characteristics of the spark advance by the spark advance control device 12 of the present invention is further improved by using it in combination with the centrifugal advance mechanism governed by the engine speed.

Figure 6:
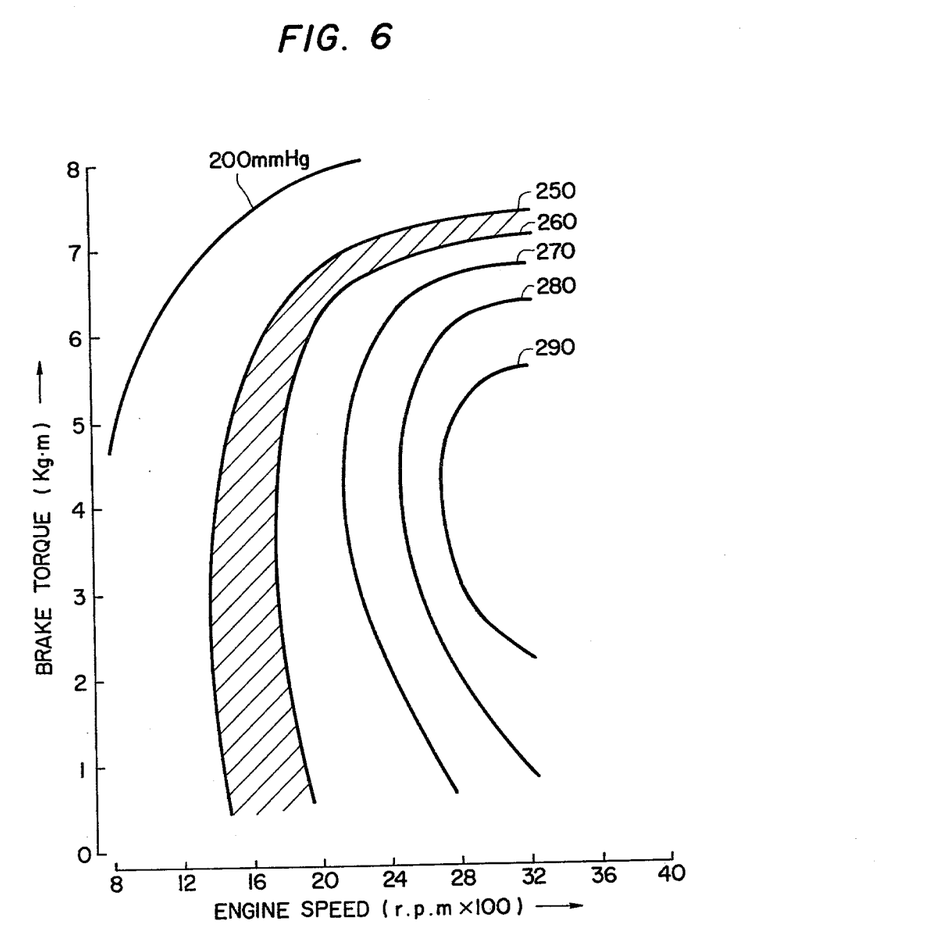
FIG. 6 is a graph similar to FIG. 4, but showing the characteristics of the vacuum in a particular portion of the EGR system used in the engine of FIG. 3.
Figure 7:
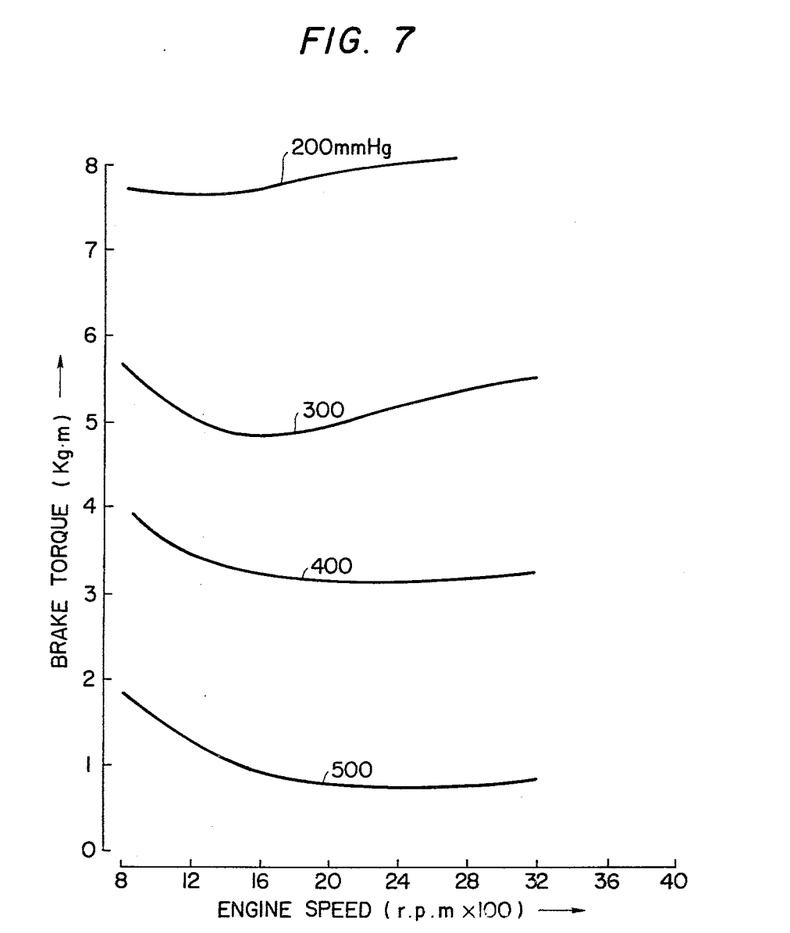
FIG. 7 is a graph similar to FIG. 4, but showing the characteristics of an engine intake vacuum.

FIG. 6 shows the characteristics of the above-mentioned composed or modified vacuum $P_b$ in the passages amoung the orifices 88 and 106 and the leak valve 94. As seen from FIG. 6, the vacuum $P_b$ seems just like intermediate value of the engine intake vacuum shown in FIG. 7 and the suction vacuum $P_a$ shown in FIG. 4. The characteristics of the vacuum $P_b$ can be varied by selecting the opening sizes of the above-mentioned orifices 88 and 106 as clearly shown in FIG. 8 in which the numerals of orifices (a) and (b) indicate the orifice sizes of the orifices 106 and 88, respectively. By the orifice size, the diameter (mm) of the circular opening of the orifice is meant. When the orifice sizes of the orifices 106 and 88 are selected to be 1.0 mm and 0.9 mm, respectively, the characteristics of the vacuum $P_b$ becomes one shown in FIG. 6 in which the vacuum $P_b$ is generally a function of the engine speed at low and medium load engine operating range. Accordingly, in this case, it is possible to omit a centrifugal advance mechanism. Although the vacuum $P_b$ does not increase with the engine speed at high load engine operating range to allow a small degree of the spark advance, this manner of spark advance is suitable because the combustion speed is increased to maintain stable combustion of the charge in the combustion chamber at high load engine operating range.

Figure 8:
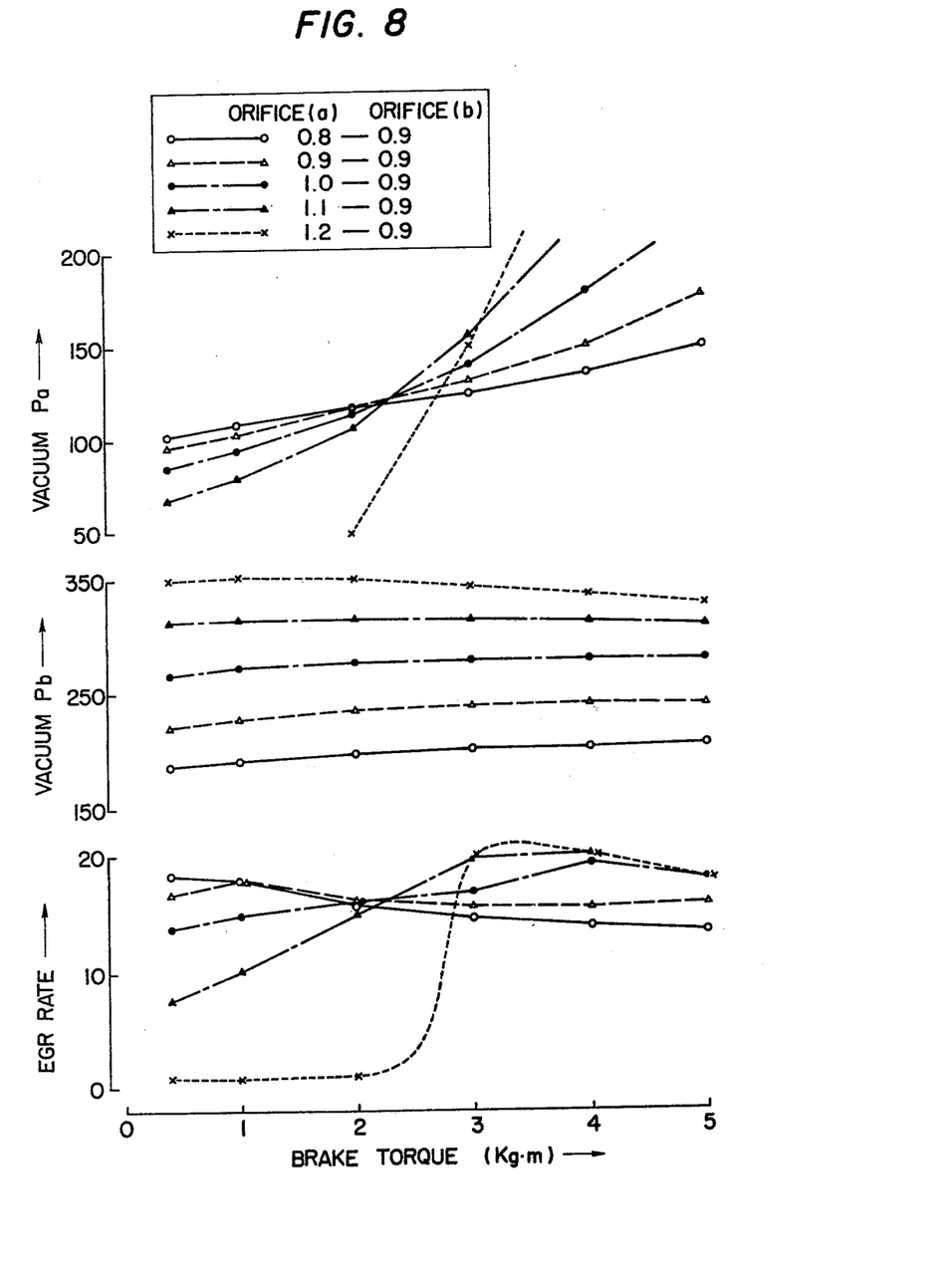
FIG. 8 is graphs showing the variations of the vacuum signals of FIGS. 4 and 6 and of EGR rate on variation of the sizes of the orifices used in the EGR system of FIG. 3.

It will be seen from FIG. 8, that the characteristics of the suction vacuum $P_a$ and exhaust gas recirculation (EGR) rate (the volume rate of the recirculated exhaust gases relative to the intake air inducted to the engine) can be changed by selecting various sizes of the orifices 88 and 106. The data of FIG. 8 was obtained by tests conducted under a condition where engine speed was 2,400 rpm.

Figure 9:
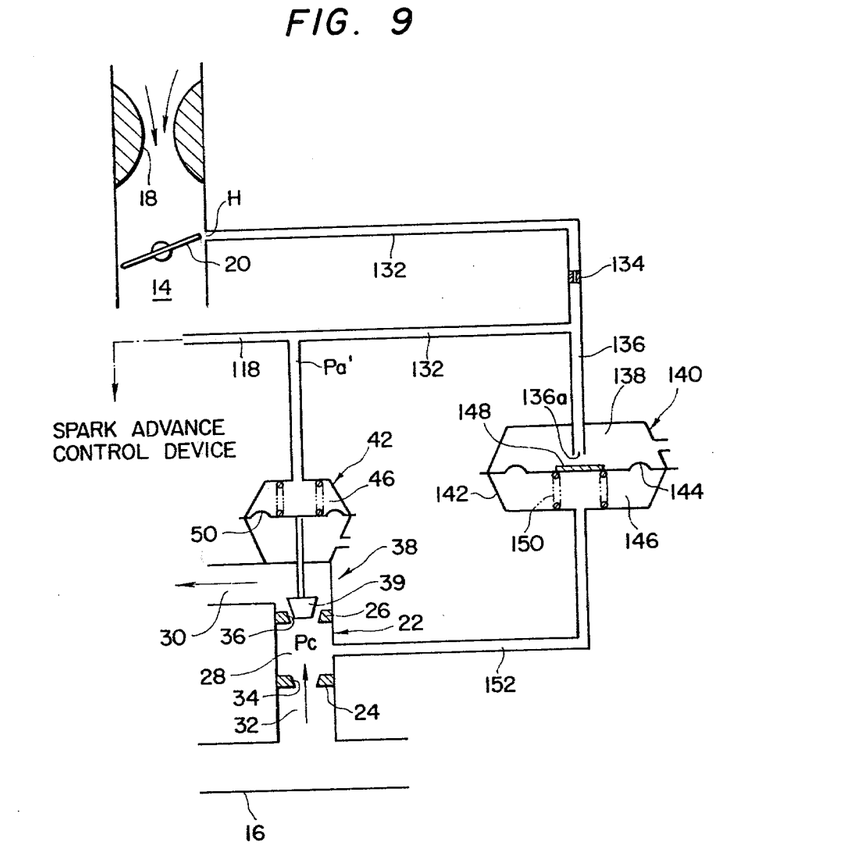
FIG. 9 is a schematic illustration of another preferred embodiment of the engine in accordance with the present invention.

FIG. 9 illustrates another preferred embodiment of the engine according to the present invention, which is essentially similar to that of FIG. 3 and, as such, like reference numerals are assigned to corresponding parts and elements.

In this case, the vacuum operating chamber 46 of the diaphragm unit 42 of the EGR control valve assembly 38 communicates through a passage 132 with the intake passageway 14. The passage 132 opens adjacent the edge of the throttle valve 20 through the hole H which is located just upstream of the uppermost portion of the peripheral edge of the throttle valve at its fully closed position. The passage 132 is provided thereinside with an orifice 134. The passage 132 is connected through the passage 118 to the vacuum operating chamber 116 of the vacuum operated spark advance control device 12 though not shown.

A passage 136 or a pipe is branched off from the passage 132 between the orifice 134 and a portion from which the passage 118 is branched off. The passage 136 extends into an atmospheric chamber 138 of an exhaust pressure control valve assembly 140. The chamber 138 communicates with the atmosphere. The control valve assembly 140 consists of a casing 142 and a flexible diaphragm 144 which divides the interior of the casing into the atmospheric chamber 138 and an exhaust pressure chamber 146. The diaphragm 144 is provided at its central portion with a flat valve member 148 which is arranged to be contactable to close the open end 136a of the passage 136. A spring 150 is disposed in the exhaust pressure chamber 146 to urge the diaphragm 144. The exhaust pressure chamber 146 is communicated through a passage 152 with the chamber 28 to be supplied with a pressure $P_c$.

With this arrangement, when the exhaust gas pressure is increased to increase the pressure $P_c$ in the chamber 28, the diaphragm 144 is moved upwardly in the drawing to cause the valve member 148 to close the open end 136a of the passage 136. As a result, the intake vacuum at the hole H is introduced as a vacuum $P_a'$ into the vacuum operating chamber 46 of the EGR control valve 38. Then, the opening degree of the EGR control valve 38 is increased and therefore the pressure $P_c$ in the chamber 28 is decreased. On the contrary, when the exhaust gas pressure is decreased to decrease the pressure $P_c$ in the chamber 28, the diaphragm 144 is moved downwardly in the drawing to open the open end 136a of the passage 136. As a result, the intake vacuum in the passage 132 is diluted with air bled through the passage 136 and accordingly the opening degree of the EGR control valve 38 is decreased to increase the pressure $P_c$ in the chamber 28.

It is to be noted that, by the repetition of such operations or feedback controls, the pressure $P_c$ in the chamber 28 is maintained constant regardless of the variation of the exhaust pressure upstream of the orifice 34 disposed in the EGR passageway 22. Accordingly, the amount of the recirculated exhaust gases is controlled proportional to the exhaust pressure upstream of the orifice 34, the exhaust pressure upsteam of the orifice 34 being generally same as the exhaust pressure in the exhaust gas passageway 16 which exhaust pressure is a function of exhaust gas amount proportional to the intake air amount.

It will be understood from the foregoing, that the vacuum $P_a'$ increases with increase of the amount of the recirculated exhaust gases, and therefore the spark timing is controlled in accordance with the amount of the recirculated exhaust gases by conducting the vacuum $P_a'$ to the vacuum operating chamber 116 (not shown) of the spark advance control device 12.

As is apparent from the foregoing discussion, according to the present invention, since the spark advance of the engine is controlled in accordance with the amount of recirculated exhaust gases, stable engine operation is obtained, improving driveability and fuel consumption of a motor vehicle even under a considerably high EGR rate.

What is claimed is:

1. In an internal combustion engine including a combustion chamber, an intake passageway providing communication between the atmosphere and the combustion chamber, a venturi formed in the intake passageway, a throttle valve rotatably disposed in the intake passageway downstream of the venturi, and an exhaust gas passageway providing communication between the combustion chamber and the atmosphere, the improvement comprising:

means defining an EGR passageway providing communication between the exhaust gas passageway and the intake passageway for recirculating exhaust gas back to the combustion chamber;

a diaphragm actuated EGR control valve operatively disposed in said EGR passageway to divide said EGR passageway into an upstream portion connecting to the exhaust gas passageway and a downstream portion connecting to the intake passageway, said EGR control valve being operative to change the pressure of the exhaust gas in the upstream portion of said EGR passageway to control the flow of the recirculated exhaust gas, the diaphragm of said EGR control valve defining a first chamber which communicates through means defining a first passage with the intake passageway to provide the first chamber with an intake vacuum in the intake passageway;

control means for controlling the intake vacuum to be provided to the first chamber of said EGR control valve to change the exhaust gas pressure in the upstream portion of said EGR passageway in accordance with the exhaust gas pressure in the upstream portion of said EGR passageway and in accordance with venturi vacuum generated at the venturi in the intake passageway, said control means including means defining a second passage connecting to said first passage and having an inlet port communicating with the atmosphere for bleeding atmospheric air into said second passage to dilute the vacuum in said first chamber, a pressure regulating valve located with a head movable relative to said inlet port of said second passage for controlling the flow of atmospheric air bled through said inlet port into said second passage, and operating means operatively connected to said pressure regulating valve such that said pressure regulating valve changes the bleed of atmospheric air through said inlet port in response to the change in the vacuum at said venturi and in response to the change in the exhaust gas pressure in the upstream portion of said EGR passageway to change the dilution of the intake vacuum provided to said first chamber, said operating means including a first flexible diaphragm defining a second chamber communicating with said venturi through means defining a third passage to receive said venturi vacuum therefrom, and a second flexible diaphragm defining a third chamber communicating with the upstream portion of EGR passageway to receive the exhaust gas pressure therefrom, said second flexible diaphragm being fixedly connected to said first diaphragm, said first and second diaphragms being operatively connected to said pressure regulating valve such that said pressure regulating valve is operated to change the flow of atmospheric air through said inlet port in response to the change in the venturi vacuum provided in said second chamber and in response to the change in the exhaust gas pressure provided in said third chamber; and means for controlling the spark timing of a spark plug disposed in the combustion chamber in accordance with intake vacuum to be provided to the first chamber of said EGR control valve.

2. The improvement as claimed in claim 1, further comprising a flow restriction disposed in said EGR passageway upstream of said EGR control valve to restrict the amount of the exhaust gases passing through the EGR passageway, said flow restriction defining a chamber between it and said EGR control valve.

3. The improvement as claimed in claim 1, in which the spark timing control means includes means for advancing the spark timing of the spark plug in response to the vacuum in the first passage.

4. The improvement as claimed in claim 3, in which said spark advancing means includes a diaphragm member defining a vacuum operating chamber which communicates with the first passage, a spring member disposed in the vacuum operating chamber to normally urge said diaphragm member to increase the volume of vacuum operating chamber, a breaker plate rotatably disposed around a revolving cam and carrying thereon a contact breaker point which is openable by the action of the revolving cam, a rod connecting between said diaphragm member and said breaker plate, said rod being arranged to cause said breaker plate to rotate clockwise to advance the spark timing when said diaphragm member is urged in a direction to decrease the volume of the vacuum operating chamber by the action of the vacuum from the first passage.

5. The improvement as claimed in claim 1, further comprising leak valve means for bleeding air into the second chamber of said operating means when the combined vacuum of the intake vacuum in said intake passageway and the vacuum in said first chamber exceeds a predetermined level representing a high speed and low load engine operation.

6. The improvement as claimed in claim 5, in which said leak valve means includes means defining a fourth passage connecting said third passage and said first passage on the intake passageway side of the junction to which said second passageway is connected, a leak valve disposed in said fourth passage and including a diaphragm valve member dividing the interior of the casing thereof into a vacuum chamber communicating with the first passage and an atmospheric chamber communicating with the third passage and with the atmosphere, an open end portion connecting to the fourth passage on the third passage side, said open end portion being secured to a portion of the casing defining the atmospheric chamber, and a spring disposed in said vacuum chamber to normally urge said diaphragm valve member to contact to said open end portion so as to close said open end portion, said spring being arranged to be contracted to separate said diaphragm valve member from said open end portion when the degree of the vacuum applied to said vacuum chamber exceeds said predetermined level.

7. The improvement as claimed in claim 1, in which said first passage opens adjacent the edge of said throttle valve through a hole which is located just upstream of the uppermost portion of the peripheral edge of said throttle valve at its fully closed position.

8. In a internal combustion engine including a combustion chamber, an intake passageway providing communication between the atmosphere and the combustion chamber, a venturi formed in the intake passageway, a throttle valve rotatable disposed in the intake passageway downstream of the venturi, and an exhaust gas passageway providing communication between the combustion chamber and the atmosphere, the improvement comprising:

means defining an EGR passageway providing communication between the exhaust gas passageway and the intake passageway for recirculating exhaust gas back to the combustion chamber;

a diaphragm actuated EGR control valve operatively disposed in said EGR passageway to divide said EGR passageway into an upstream portion connecting to the exhaust gas passageway and a downstream portion connecting to the intake passageway, said EGR control valve being operative to change the pressure of the exhaust gas in the upstream portion of said EGR passageway to control the flow of the recirculated exhaust gas, the diaphragm of said EGR control valve defining a first chamber which communicates through means defining a first passage with the intake passageway to provide the first chamber with an intake vacuum in the intake passageway;

control means for controlling the intake vacuum to be provided to the first chamber of said EGR control valve to change the exhaust gas pressure in the upstream portion of said EGR passageway in accordance with the exhaust gas pressure in the upstream portion of said EGR passageway and in accordance with venturi vacuum generated at the venturi in the intake passageway, said control means comprising means defining a second passage connecting to said first passage and having an inlet port communicating with the atmosphere for bleeding atmosphereic air into said second passage to dilute the vacuum in said first chamber, a pressure regulating valve located with a head movably relative to said inlet port of said second passage for controlling the flow of atmospheric air bled through said inlet port into said second passage, and operating means operatively connected to said pressure regulating valve such that said pressure regulating valve changes the bleed of atmospheric air through said inlet port in response to the change in the vacuum at said venturi and in response to the change in the exhaust gas pressure in the upstream portion of said EGR passageway to change the dilution of the intake vacuum provided to said first chamber, said operating means comprising a first flexible diaphragm defining a second chamber communicating with said venturi through means defining a third passage to receive the venturi vacuum therefrom; and a second flexible diaphragm defining a third chamber communicating with the upstream portion of EGR passageway to receive the exhaust gas pressure therefrom, said second flexible diaphragm being fixedly connected to said first diaphragm, said first and second diaphragm being operatively connected to said pressure regulating valve such that said pressure regulating valve is operated to change the flow of atmospheric air through said inlet port in response to the change in the venturi vacuum provided in said second chamber, and in response to the change in the exhaust gas pressure provided in said third chamber;

means for controlling the spark timing of a spark plug disposed in the combustion chamber in accordance with the intake vacuum to be provided to the first chamber of said EGR control valve; and leak valve means for bleeding air into the second chamber of said operating means when the combined vacuum of the intake vacuum in said intake passageway and the vacuum in said first chamber exceeds a predetermined level representing a high speed and low load engine operation.

* * * * *